United States Patent
Iwamura

(10) Patent No.: US 12,545,614 B2
(45) Date of Patent: Feb. 10, 2026

(54) BEAD PRODUCTION METHOD

(71) Applicant: TOLEDO MUSEUM OF ART, Toledo, OH (US)

(72) Inventor: Alan Iwamura, Toledo, OH (US)

(73) Assignee: TOLEDO MUSEUM OF ART, Toledo, OH (US)

( * ) Notice: Subject to any disclaimer, the term of this patent is extended or adjusted under 35 U.S.C. 154(b) by 232 days.

(21) Appl. No.: 18/159,936

(22) Filed: Jan. 26, 2023

(65) Prior Publication Data

US 2023/0234876 A1 Jul. 27, 2023

Related U.S. Application Data

(60) Provisional application No. 63/303,632, filed on Jan. 27, 2022.

(51) Int. Cl.
C03B 19/10 (2006.01)

(52) U.S. Cl.
CPC ........ *C03B 19/101* (2013.01); *C03B 19/1095* (2013.01)

(58) Field of Classification Search
None
See application file for complete search history.

(56) References Cited

PUBLICATIONS

Corning Museum of Glass, "Beadmaking with Kristina Logan, Master Class Series, Volume VII", youtube video—https://www.youtube.com/watch?v=qjNjrEzVOj4&t=1444s , upload date May 28, 2020. (Year: 2020).*
Corning Museum of Glass, "Bring The Heat: Tom Ryder Live Glassmaking Demonstration", youtube video—https://www.youtube.com/watch?v=ocCoKmx6EhQ, uploaded Oct. 5, 2021. (Year: 2021).*
Corning Museum of Glass, Working with Murrine with David Salvadore—Master Class Series Volume VIII—youtube video—https://www.youtube.com/watch?v=5IA6CuOzXZw&t=298s—upload date Nov. 7, 2016. (Year: 2016).*
Corning Museum of Glass, "Meet the Artist: Raven Skyriver", youtube video—https://www.youtube.com/watch?v=wUz2cJ5I00w, uploaded Feb. 16, 2013. (Year: 2013).*
Devardi Glass, "Devardi Glass Lampwork Stainless Steel Mandrels", https://devardiglass.com/mandrels.htm—per Wayback Machine available online Sep. 2020. (Year: 2020).*
Northstar Glassworks, "Northstar Glassworks Annealing", https://northstarglass.com/annealing/, per Wayback Machine, available Nov. 12, 2020, 3 pages. (Year: 2020).*
Magicofmaking, "Magic of Making—Glass Marbles", https://www.youtube.com/watch?v=1cXy7gxUtbU, video upload date Nov. 2010. (Year: 2010).*
Ruzsa et al., "Glass Art Technique" Mostly Glass Gallery—https://mostlyglass.com/glass-art-technique/, per Wayback Machine available Apr. 2021. (Year: 2021).*

* cited by examiner

*Primary Examiner* — Lisa L Herring
(74) *Attorney, Agent, or Firm* — James D. Miller; Shumaker, Loop & Kendrick, LLP

(57) ABSTRACT

A method of forming a glass bead includes a step of hot working a first layer of molten glass on a mandrel. The method includes another step of fusing a first molten glass structure to the first layer of molten glass to form a fused workable piece. The first molten glass structure includes a first color. The method includes yet another step of forming the fused workable piece into the glass bead including the first color dispersed through the glass bead.

9 Claims, 11 Drawing Sheets

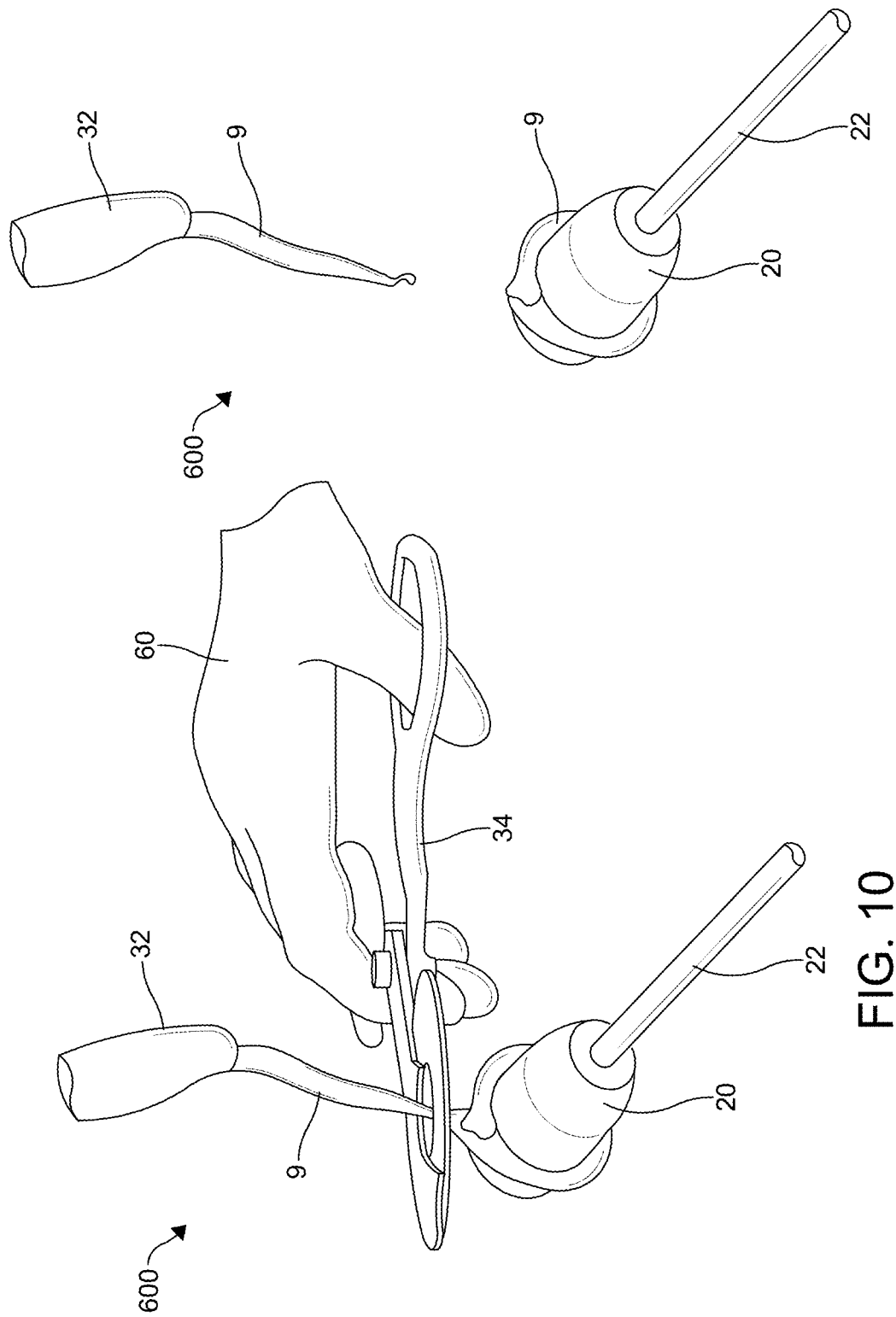

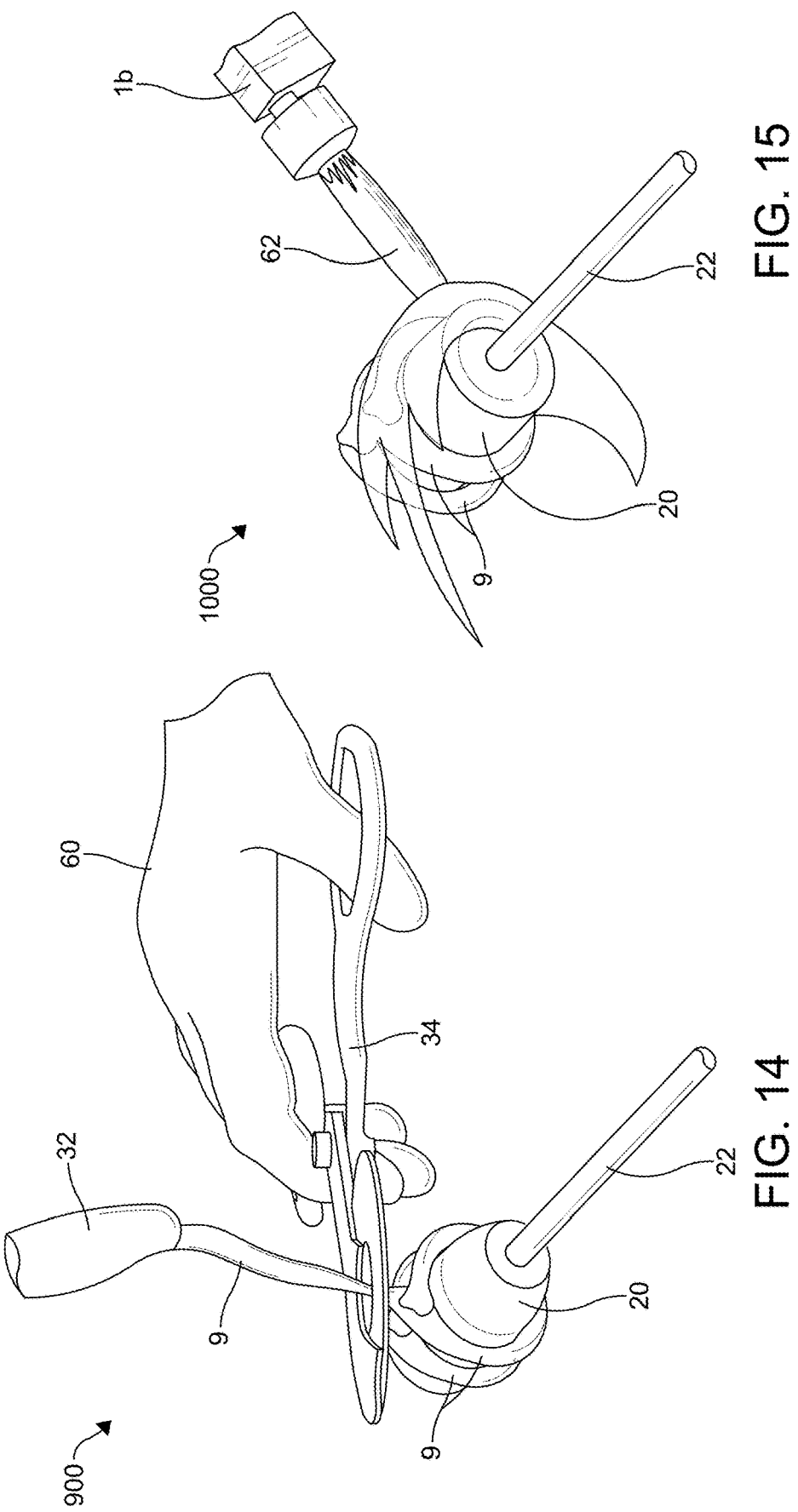

BEAD PRODUCTION METHOD

CROSS REFERENCE TO RELATED APPLICATIONS

This application claims the benefit of U.S. Provisional Application No. 63/303,632, filed on Jan. 27, 2022. The entire disclosure of the above application is hereby incorporated herein by reference.

FIELD

The present invention relates to a glass bead and a method of producing the glass bead, the method including the steps of using a hot shop method by applying molten glass to a turning mandrel.

BACKGROUND OF THE INVENTION

Glass beads have many uses, and date back over 3,000 years. Historically, glass beads are categorized by a method used to manipulate the glass—wound glass beads, drawn glass beads, and molded glass beads. Some of the earliest beads of true glass were made by the winding method. Glass at a temperature high enough to make it workable, or "ductile," may be laid down or wound around a steel wire or mandrel coated in a clay slip called "bead release". The wound glass bead, while still hot, may be further shaped by manipulating with graphite, wood, stainless steel, brass, tungsten or marble tools and paddles. While still hot, or after re-heating, a surface of the bead may be decorated with fine rods of colored glass called stringers creating a type of lamp work bead.

Drawing of glass beads is known. There are several methods for making drawn glass beads, but all involve pulling a strand out of a gather of glass in such a way as to incorporate a bubble in a center of the strand to serve as a hole in the glass bead. In some methods, this was accomplished by inserting a hollow metal tube into the ball of hot glass and pulling the glass strand out around it, to form a continuous glass tube. The most common type of modern glass bead is a seed bead, a small type of bead typically less than 6 mm, traditionally monochrome, and manufactured in very large quantities. They are a modern example of mechanically-drawn glass beads. The micro-bead or "seed bead," are so called due to their tiny, regular size. Modern seed beads are extruded by machine and some look like small tubes.

Many pressed or molded glass beads are produced using thick rods that are heated and fed into a complex apparatus that stamps glass, including a needle that pierces a hole. The glass beads are rolled in hot sand to remove flashing and soften seam lines. Glass beads are also molded using a rotary machine where molten glass is fed into a center of a rotary mold and solid or hollow glass beads are formed.

However, there is a need for a simple, ergonomic, cost efficient method and process for forming glass beads with color interspersed throughout and an aperture formed therethrough, wherein the glass bead is larger in diameter than previously known glass beads used in glass bead forming.

SUMMARY OF THE INVENTION

In accordance and attuned with the present invention, a simple, ergonomic, cost efficient method and process for forming glass beads with color interspersed throughout and an aperture formed therethrough, wherein the glass bead is larger in diameter than previously known glass beads used in glass bead forming has surprisingly been discovered.

According to an embodiment of the disclosure, a method of forming a glass bead is disclosed. The method includes a step of hot working a first layer of molten glass on a mandrel. The method includes another step of fusing a first molten glass structure to the first layer of molten glass to form a fused workable piece. The first molten glass structure includes a first color. The method includes a last step of forming the fused workable piece into the glass bead including the first color dispersed through the glass bead.

BRIEF DESCRIPTION OF THE DRAWINGS

The above, as well as other objects and advantages of the invention, will become readily apparent to those skilled in the art from reading the following detailed description of an embodiment of the invention when considered in the light of the accompanying drawings which are described below. These show, to some extent in highly simplified representations:

FIG. 10 illustrates cutting the first one of the glass structures with a cutting tool according to a sixth step of the method of forming glass beads;

FIG. 11 illustrates the first one of the glass structures and the molten glass after cutting the first one of the glass structures according to the sixth step of the method of forming glass beads;

FIG. 14 illustrates cutting the second one of the glass structures with a cutting tool according to a ninth step of the method of forming glass beads;

FIG. 15 illustrates heating the molten glass after the second one of the glass structures is fused thereon with the heating tool according to a tenth step of the method of forming glass beads;

DETAILED DESCRIPTION OF AN EMBODIMENT

The following detailed description and appended drawings describe and illustrate various embodiments of the invention. The description and drawings serve to enable one skilled in the art to make and use the invention, and are not intended to limit the scope of the invention in any manner.

As used herein, substantially is defined as "to a considerable degree" or "proximate" or as otherwise understood by one ordinarily skilled in the art. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Where any conflict or ambiguity may exist between a document incorporated by reference and this detailed description, the present detailed description controls. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section discussed below could be termed a second element, component, region, layer. As used herein "configured to" is a structural term and refers to the structure of the apparatus being disclosed. As used herein "heat worked" or "heat working" means heating the glass to a temperature where it is workable to be formed into a desired shape, structure, or form. For glass forming, dry materials are heated to a certain temperature until in a viscous state to enable easy forming by an artist into the desired shape. Additionally, as used herein, "color" refers to any color in the color spectrum, including white, gray, and black. "Non-color" or "without color" or similar verbiage refers to a substantially clear, transparent, and without opacity, (i.e. "See-through) state.

Figure 1:
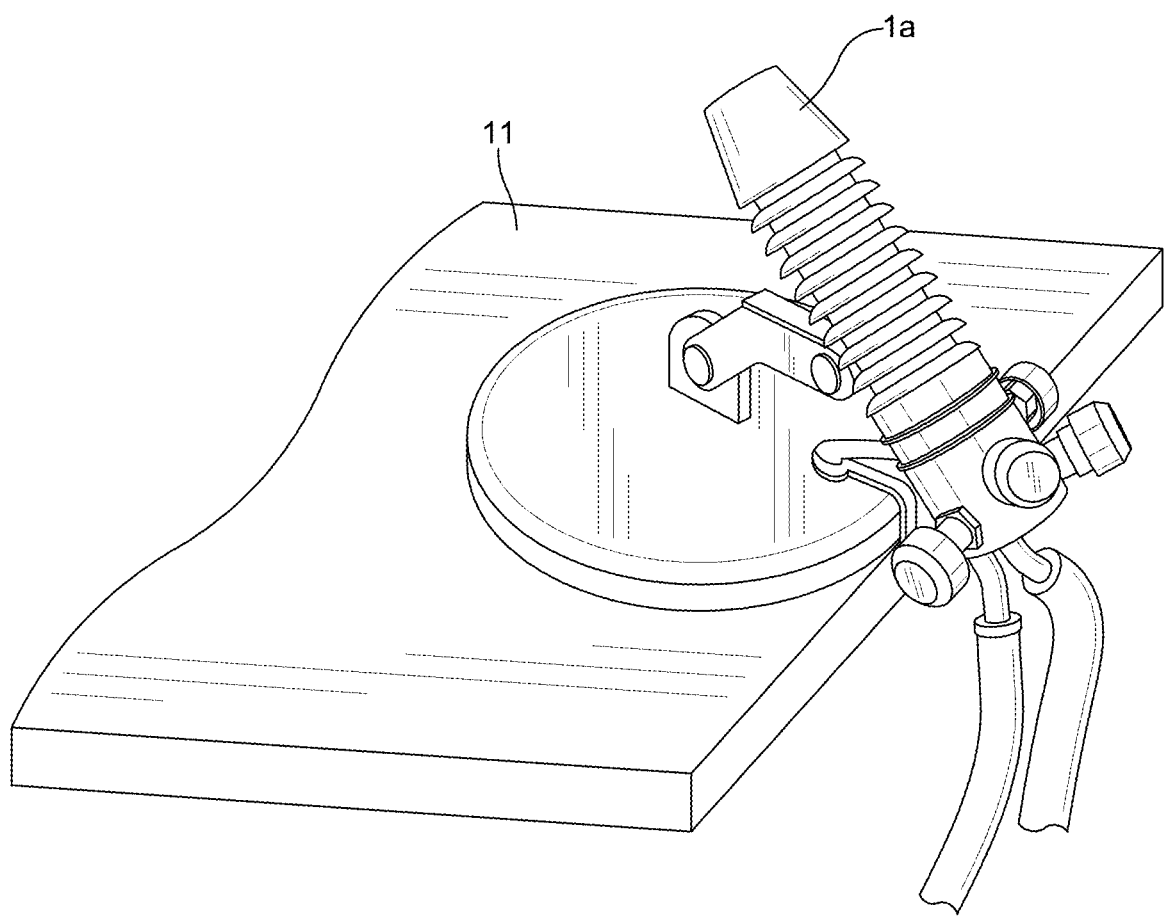
FIG. 1 illustrates a non-flammable table with a heating tool disposed thereon used in a method for forming glass beads in accordance with an embodiment of the disclosure.

FIG. 1 illustrates a heating tool 1a and non-flammable table 11 used during the method of forming glass beads according to the disclosure. The heating tool 1a is a torch, for example. However, the heating element 1a can be any electric, gas, or any other energy producing heating element as desired with or without a flame. Additionally, the heating tool 1b can be a handheld device (i.e a hand torch) as shown in FIGS. 7, 9, 12, and 15 or a heating chamber, for example. Particularly, it has been found advantageous for the heating element to be configured or capable of heating glass so the glass may be desirably heat worked.

Figure 2:
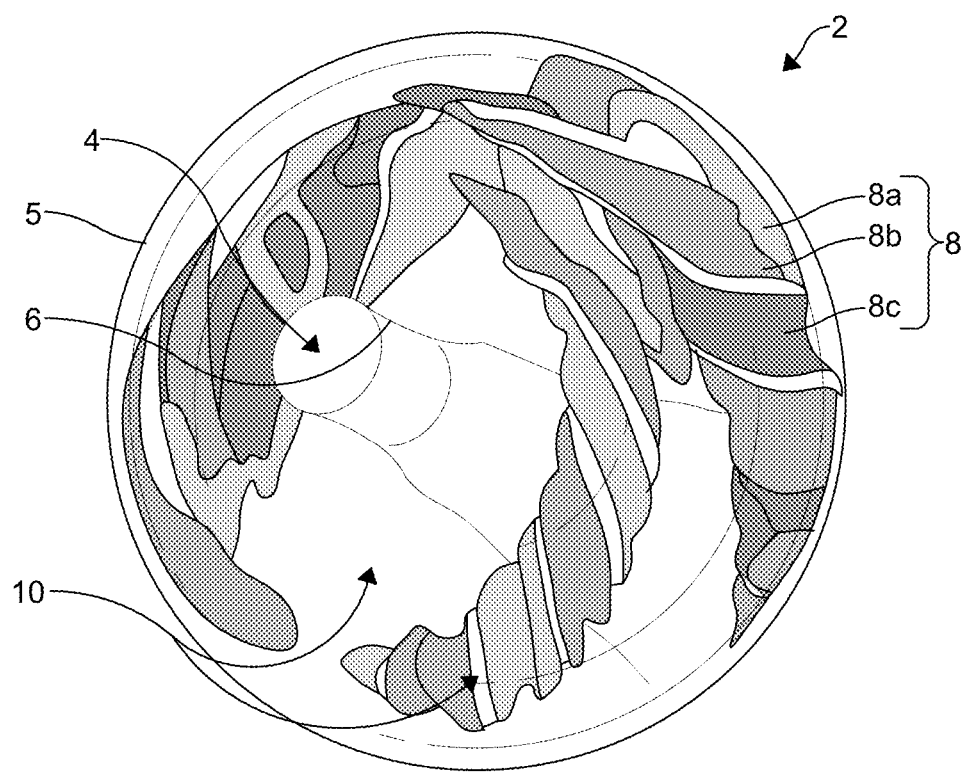
FIG. 2 illustrates an example of a glass bead with colors interspersed throughout that results from the method of forming glass beads.
Figure 3:
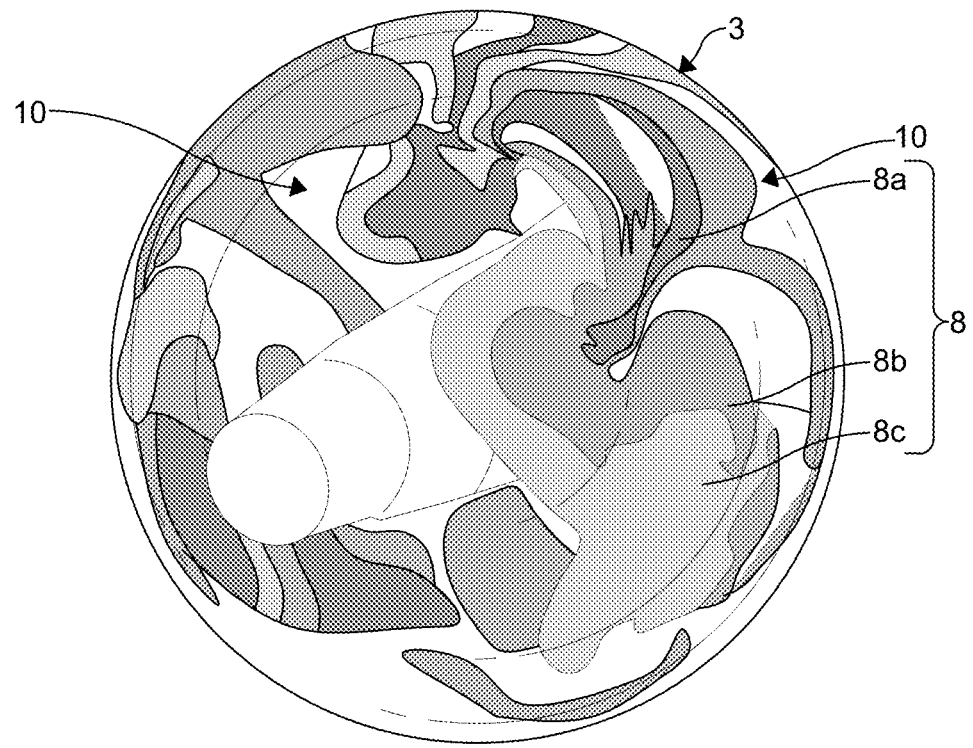
FIG. 3 illustrates a second example of a glass bead with the colors interspersed throughout that results from the method of forming glass beads.

FIGS. 2-3 illustrate examples of a solid glass bead 2, 3 formed according to the method described herein below. In FIG. 2 the glass bead 2 has a substantially cylindrically shaped cavity or aperture 4 formed therein. The glass bead 2 shown is substantially spherical and solid throughout, with the exception of the aperture 4. An outer surface 5 of the glass bead 2 is substantially smooth, polished, or substantially free from protrusions, indentations, or variance in a curvature surface. An inner wall 6 forming the aperture 4 is substantially smooth, polished, or substantially free from protrusions, indentations or variance in a curvature or linear surface. The aperture 4 is formed during the method of forming glass beads 50 by a rod or tubular structure such as a mandrel 22 used to form the glass bead 2 (further described herein below). The glass bead 2 is substantially transparent and substantially clear. Materials containing, non-clear, transparent or solid, color may be dispersed throughout the glass bead 2 to introduce color as desired. As shown, the glass bead 2 may include one or more aesthetically disposed colors 8. For example, the glass bead 2 includes a first color 8a (indicated by the light grey shaded areas), a second color 8b (indicated by the medium shaded grey areas), and a third color 8c (indicated by the dark grey shaded areas). It is understood that a single (i.e. only one) color may be included, more or fewer than three colors may be includes, or no colors may be included resulting in an entirely substantially transparent and clear bead. The substantially transparent and clear portions of the glass bead 2 are generally indicated by numeral 10. The colors 8 are formed in the glass bead 2 by decorative glass rods, color bars, or structures 9 containing the resulting colors 8. However, it is understood, the glass structures 9 can be any shape or structure other than a rod without departed from the scope of the disclosure. The glass bead 2 is approximately 2.5 inches in diameter. However, the glass bead 2 can be any diameter greater or less than 2.5 inches such as between 1-3 inches for example.

In FIG. 3, the glass bead 3 is substantially the same as the glass bead 2 of FIG. 2, except the glass bead 3 of FIG. 3 has a different arrangement of the colors 8a, 8b, 8c. Features of the glass bead 3 of FIG. 3 that are substantially similar to the features of the glass bead 2 of FIG. 2 are indicated with the same reference numerals for convenience. It is understood the colors 8 of the glass bead 3 can be the same or different from the colors of the bead 2 in FIG. 2. Each bead formed from the method of forming glass beads 2, 3 can include unique colors 8 and arrangements of the colors 8 compared to each of the other beads.

Figure 4:
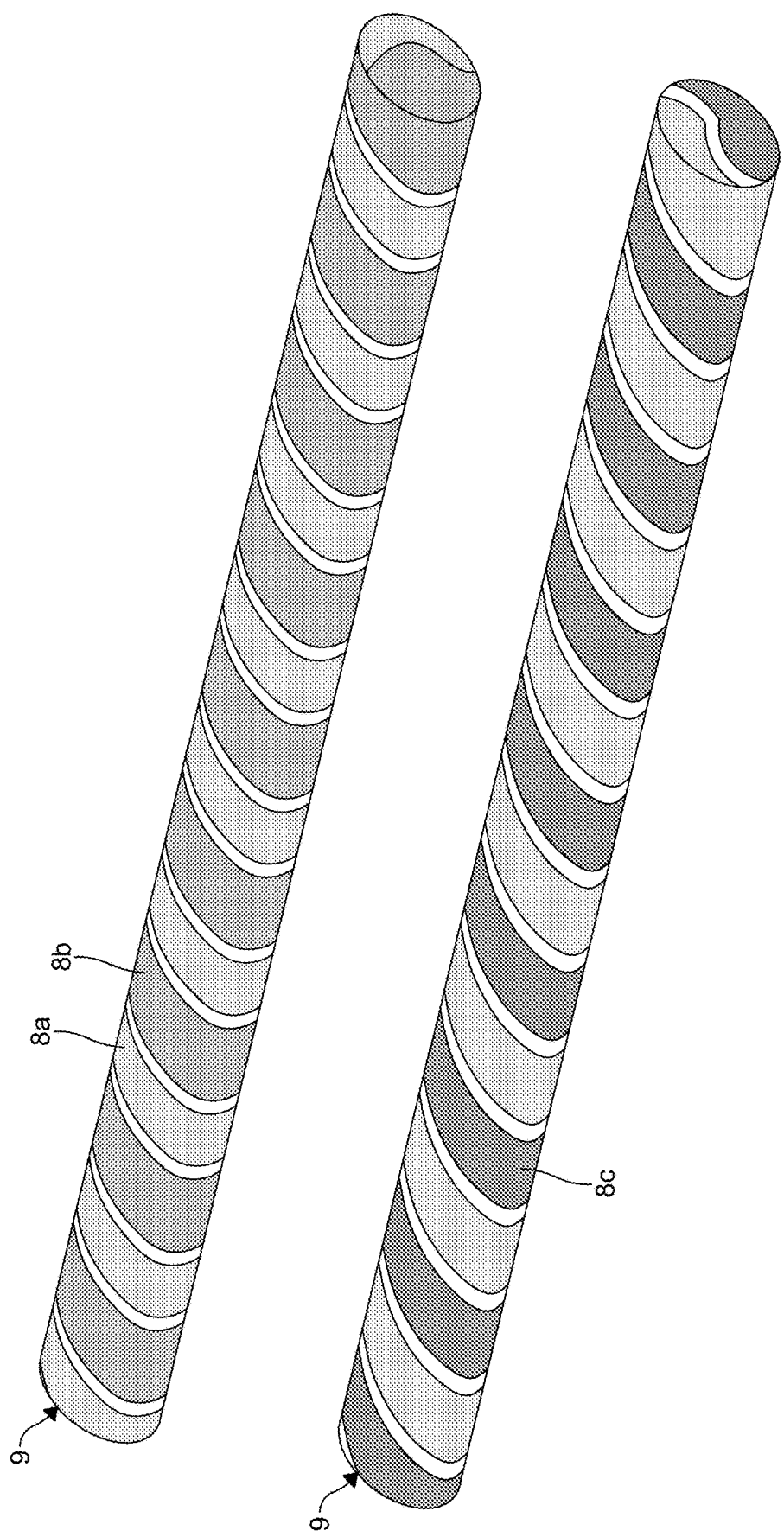
FIG. 4 illustrates an example of glass structures that are wound into molten glass to form the colors interspersed through the glass beads of FIG. 2 and FIG. 3.

In FIG. 4, the glass structures 9 for forming the colors 8 in the glass bead 2, 3 are shown. The glass structures 9 can be substantially cylindrically shaped, partially cylindrically shaped, cuboidal shaped, or any other shape as desired. The glass structures 9 include the respective colors 8a, 8b, 8c, 8d, 8e formed in the resulting glass beads 2, 3. Depending on the desired color that will be added to the resulting glass beads 2, 3, the glass structures 9 can include any one or more colors 8. The glass structures 9 are pre-formed by a glass forming process, wherein the rods or structures 9 are created from a single or multiple length of molten glass strands with or without color. As known, color is added to glass by adding various frit, minerals, and elements to clear molten glass. The structures 9 can be formed by using the heating tool 1*a*, 1*b* to create the molten glass and a manipulating tool (not shown) such as a rake, rod, carver, paddle, marver, or other known tools for manipulating glass into desired shapes and designs.

The steps of the method of forming glass beads 50 is shown in FIGS. 5-17. In a first step 100, a base or first layer of molten glass 20 is disposed on a glass forming mandrel 22. The mandrel 22 is preferably produced from stainless steel or carbon steel. However, it is understood that other materials may be used as desired. The mandrel 22 is typically provided with a bead release material (not shown) disposed on at least a portion of an outer surface thereof to aid in removal of a completed one of the glass beads 2, 3 from the mandrel 22. The mandrel 22 may be coated with a mixture of materials to militate against a sticking of the molten glass to the mandrel 22. The bead release is commonly formed from a mixture of clay and silica, but other materials may be used as desired. The glass bead 2, 3 is made up of layers of molten glass sequentially added to the mandrel 22 as described herein below.

Figure 5:
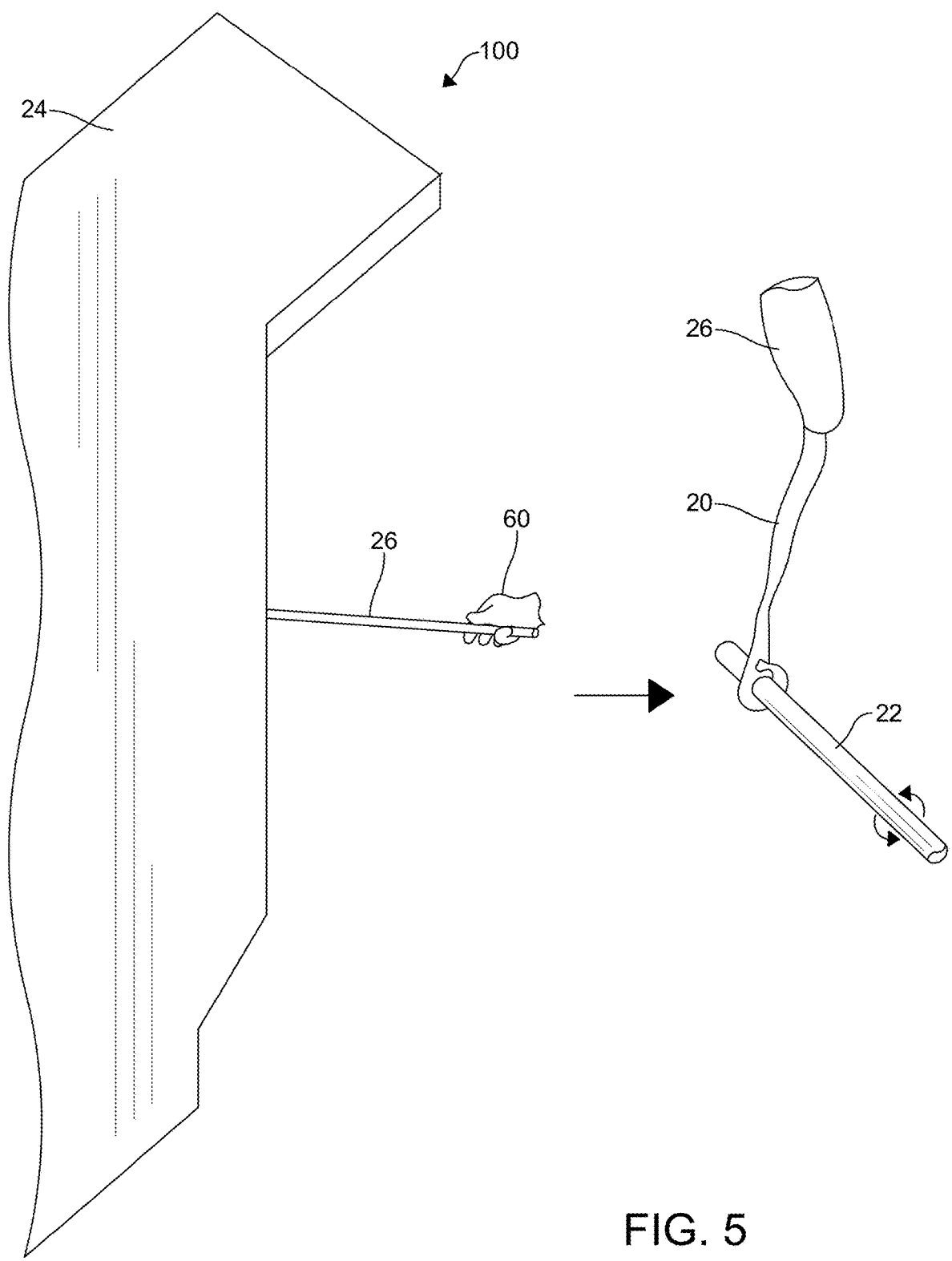
FIG. 5 illustrates disposing a base layer of molten glass on a mandrel according to a first step of the method of forming glass beads.

In accordance with the first step 100, prior to adding the first layer of molten glass 20, the mandrel 22 is preheated to a temperature of about 1500 degrees Fahrenheit, for example, by an artist 60. It is understood that other temperatures can be use without departing from the scope of the disclosure. Once heated, the mandrel 22 and the bead release are ready to accept an amount or volume of the first layer of molten glass 20. A first layer of molten glass 20 is disposed on the mandrel 22 by inserting a bit iron 26 receiving glass into a glass furnace 24 to heat the glass into the first layer of molten glass 20, as shown in FIG. 5. The bit iron 26 is used to deliver the first layer of molten glass 20 to the mandrel 22. It is also understood, the first layer of molten glass 20 may be applied to the mandrel 22 by a feeder rod or other tool, as desired. The first layer of molten glass 20, when transferred to the mandrel 22 is spooled around the mandrel 22 by winding the first layer of molten glass 20 around the mandrel 22. The winding is typically accomplished by rotating the mandrel 22 in one direction until the first layer of molten glass 20 adheres to the mandrel 22 in the desired amount.

Figure 6:
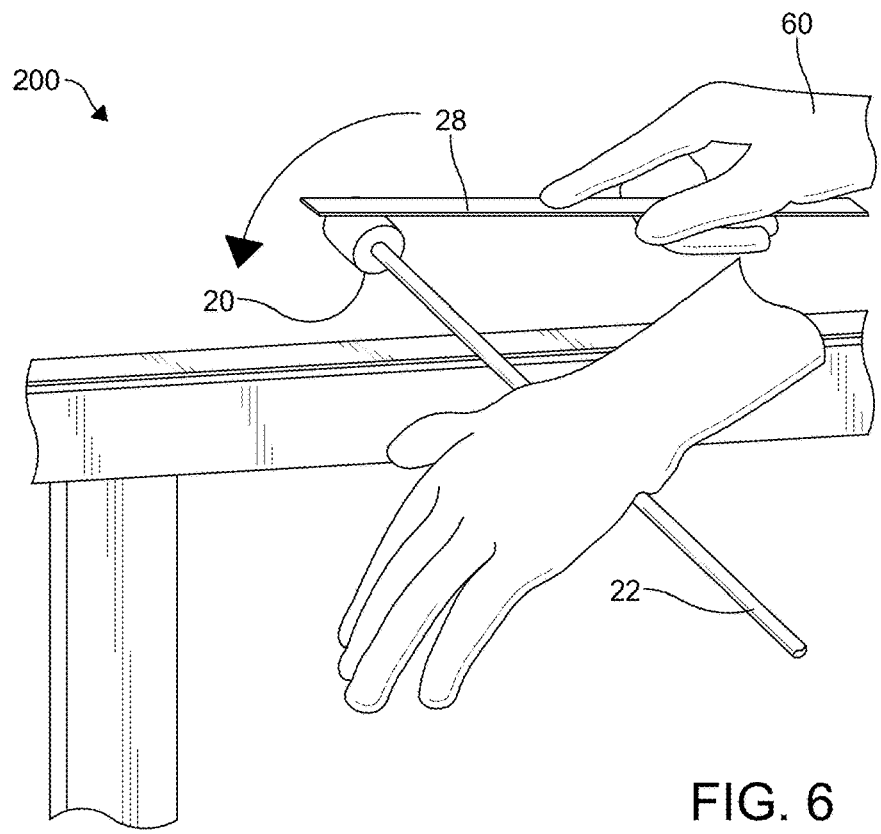
FIG. 6 illustrates the molten glass disposed on the mandrel and an artist hot working the molten glass according to a second step of the method of forming glass beads.

In a second step 200, after disposing the first layer of molten glass 20 to the mandrel 22, hot working of the first layer of molten glass 20 may be done to form the first layer of molten glass 20 into a desired shape, such as spherical or semi-spherical. The hot working may be done by the artist using the heating tool 1*b*, the furnace 24, or a reheat chamber to maintain the first layer of molten glass 20 at a desired temperature, thereby allowing the use of a manipulating tool 28 to shape or otherwise manipulate the first layer of molten glass 20 as shown in FIG. 6. In the embodiment shown, the manipulation tool 28 is a paddle but can be any tool, as desired.

Figure 7:
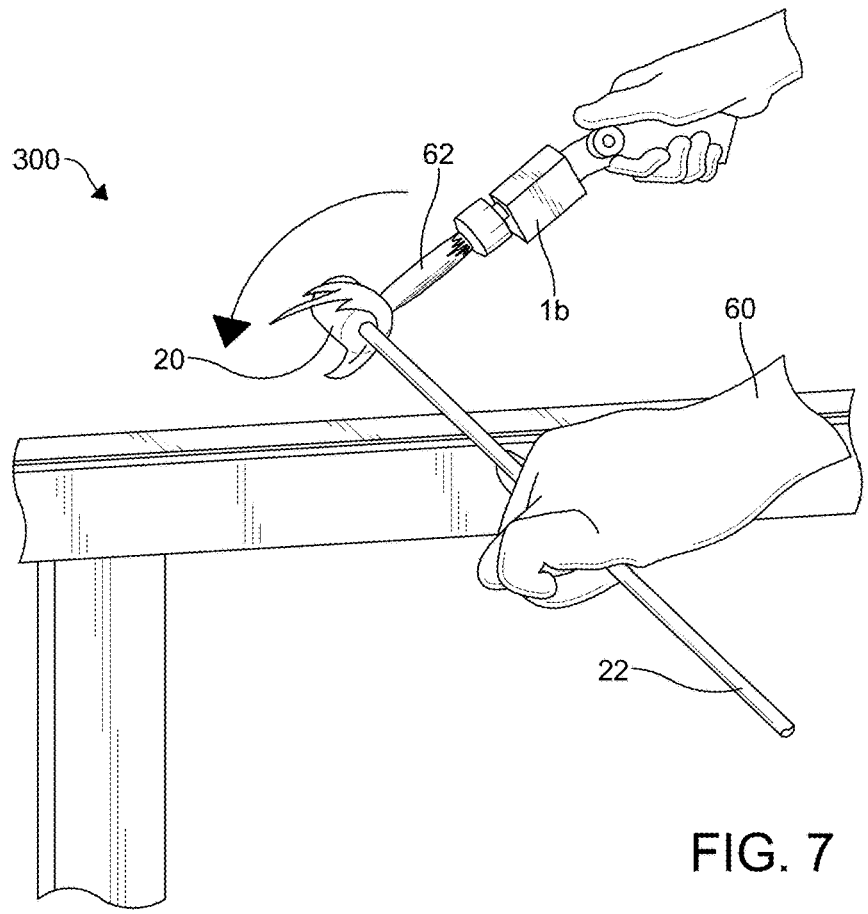
FIG. 7 illustrates the heating tool heating the molten glass to prepare a first one of the glass structures to be wound around the molten glass according to a third step of the method of forming glass beads.

In a third step 300, the heating tool 1*b* is used to heat the first layer of molten glass 20 to prepare a first one of the glass structures 9 to be wound around the first layer of molten glass 20 as shown in FIG. 7. Heat or a flame 62 is generally shown for illustrative purposes. It is understood, a second layer of molten glass can be applied to the first layer of molten glass 20 before the glass structure 9 is applied to the first layer of molten glass 20. Additional layers of molten glass greater than two layers can also be applied, as desired. These additional layers can include colors or be clear.

Figure 8:
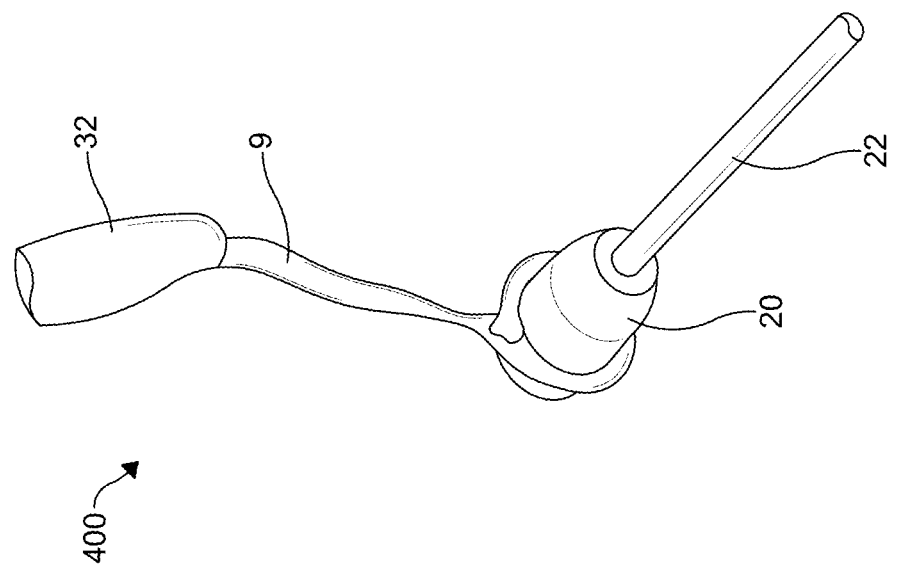
FIG. 8 illustrates the first one of the glass structures beginning to be wound around the molten glass according to a fourth step of the method of forming glass beads.

In a fourth step 400, the first one of the glass structures 9 is wound around the first layer of molten glass 20. The glass structure 9 is first attached to a feeder rod 32 and heated to a temperature that allows the glass structure 9 to be fused to the first layer of molten glass 20 or additional layer and wound around the first layer of molten glass 20 in a desired orientation and to a desired length along the first layer of molten glass 20, as shown in FIG. 8. The heating of the glass structure 9 may be accomplished by the heating tool 1*b*, for example. The feeder rod 32 is advantageously made of steel and is configured to transfer the molten glass structure 9 to the mandrel 22 at a temperature of about 2100 degrees Fahrenheit. It is understood that other materials can be used for the feeder rod 32 and other temperatures can be employed.

Figure 9:
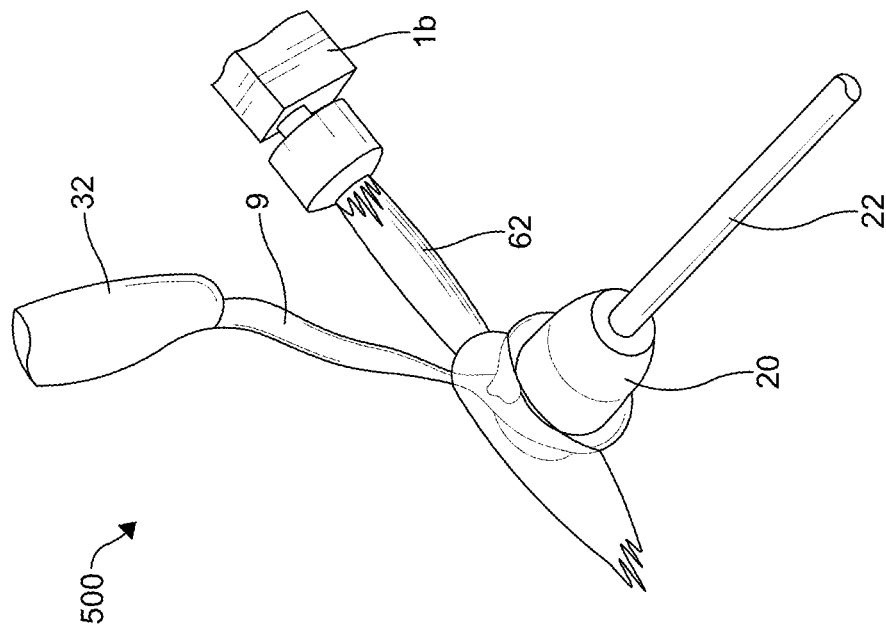
FIG. 9 illustrates fusing the first one of the glass structures to the molten glass on the mandrel according to a fifth step of the method of forming glass beads.

In a fifth step 500, the molten glass structure 9 is fused to the first layer of molten glass 20 (or additional layer of molten glass) by the heating tool 1*b* as shown in FIG. 9. In a sixth step 600, as shown in FIG. 10, the molten glass structure 9 is cut by a cutting tool 34 to separate the wound molten glass structure 9 from the feeder rod 32. The cutting tool 34 is a cutting tool specifically for glass forming. Although, any tool or method configured for cutting the glass structure 9 can be employed, as desired. As shown in FIG. 11, the molten glass structure 9 that was cut is shown.

Figures 12, 13:
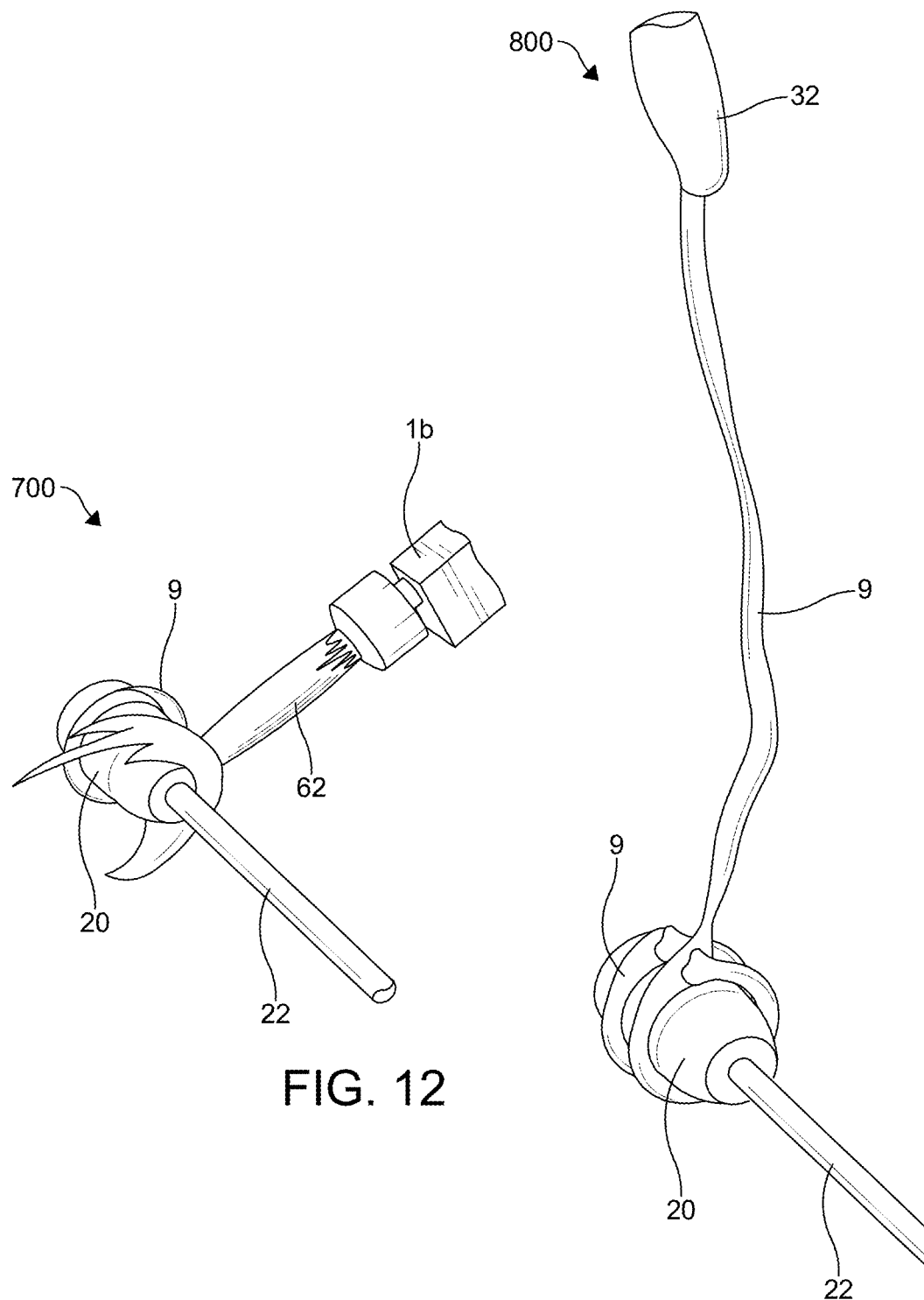
FIG. 12 illustrates heating the molten glass after the first one of the glass structures is fused thereon with the heating tool according to a seventh step of the method of forming glass beads.
FIG. 13 illustrates a second one of the glass structures beginning to be wound around the molten glass according to an eighth step of the method of forming glass beads.

In a seventh step 700, as shown in FIG. 12, the first layer of molten glass 20 and the glass structure 9 is wound on the first layer of molten glass 20 are heated again to prepare for the second layer of molten glass or additional ones of the glass structures 9. The first layer of molten glass 20 and the glass structure 9 can be heated by the heating tool 1*b*.

In an eighth step 800, as shown in FIG. 13, a second one of the glass structures 9 being wound onto the first layer of molten glass 20 or additional layers of molten glass. It is understood, the second one of the glass structures 9 could be the first one of the glass structures 9 positioned at a different portion of the length of the first layer of molten glass 20. In a ninth step 900, as shown in FIG. 14, the second one of the glass structures 9 is cut by the cutting tool 34. In a tenth step 1000, as shown in FIG. 15, the second one of the glass structures 9 is fused to the first layer of the molten glass 20 by the heating tool 1*b* to form a fused workable piece 35. As used herein, the fused workable piece 35 refers to a piece that includes all the layers, colors, and diameter desired by the artist. Additional colors may be added by repeating the aforementioned steps with respect to the glass structures 9. Alternatively, additional layers of the transparent molten glass may be added as described above to add layers in addition to the first layer of molten glass 20. The above are repeated until reaching the diameter and color distribution desired for the glass bead 2, 3.

Figure 16:
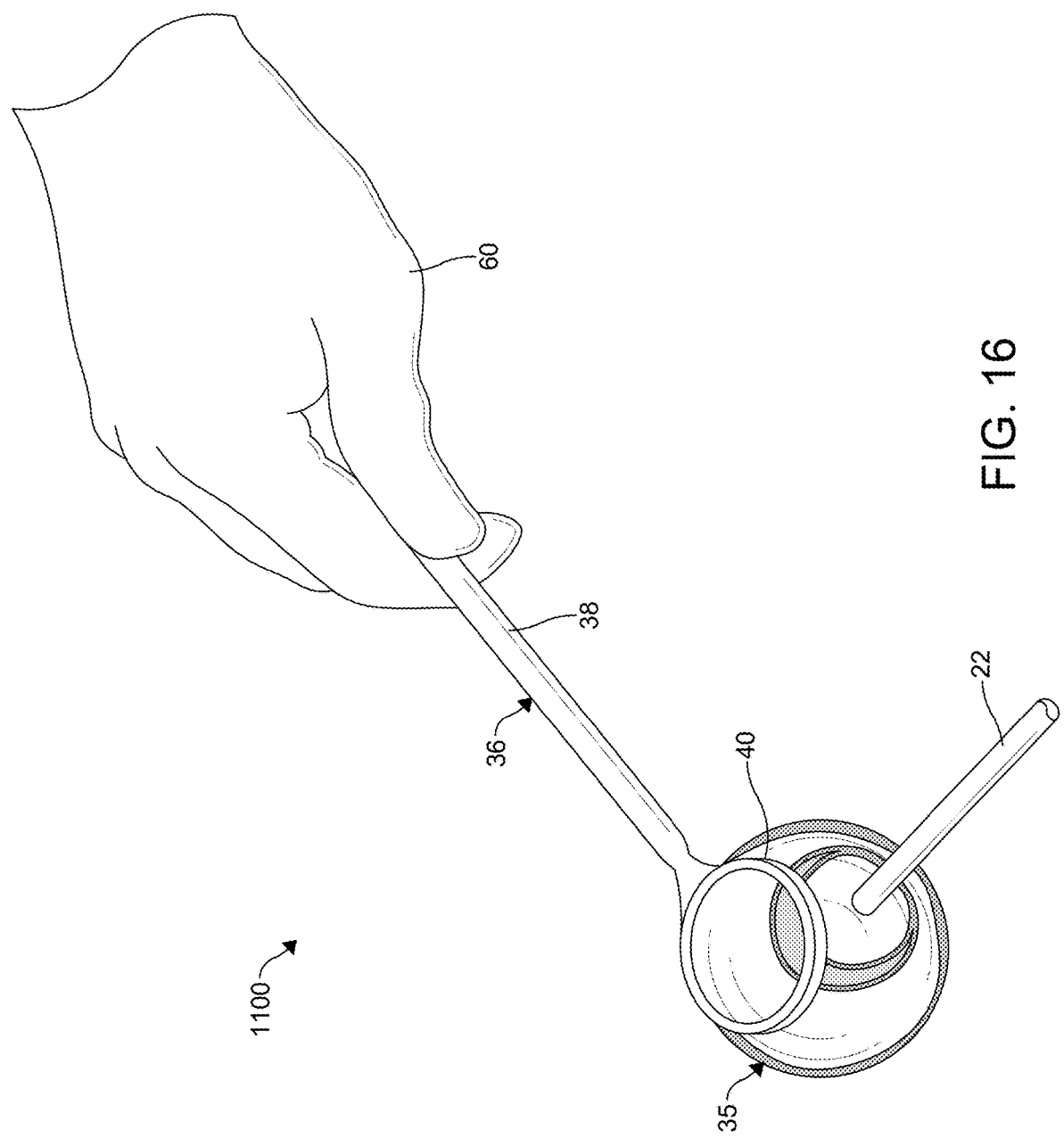
FIG. 16 illustrates forming the molten glass and the glass structures into a sphere on the mandrel by the artist with a bead forming manipulating tool while spinning the mandrel according to a eleventh step of the method of forming glass beads.
Figure 17:
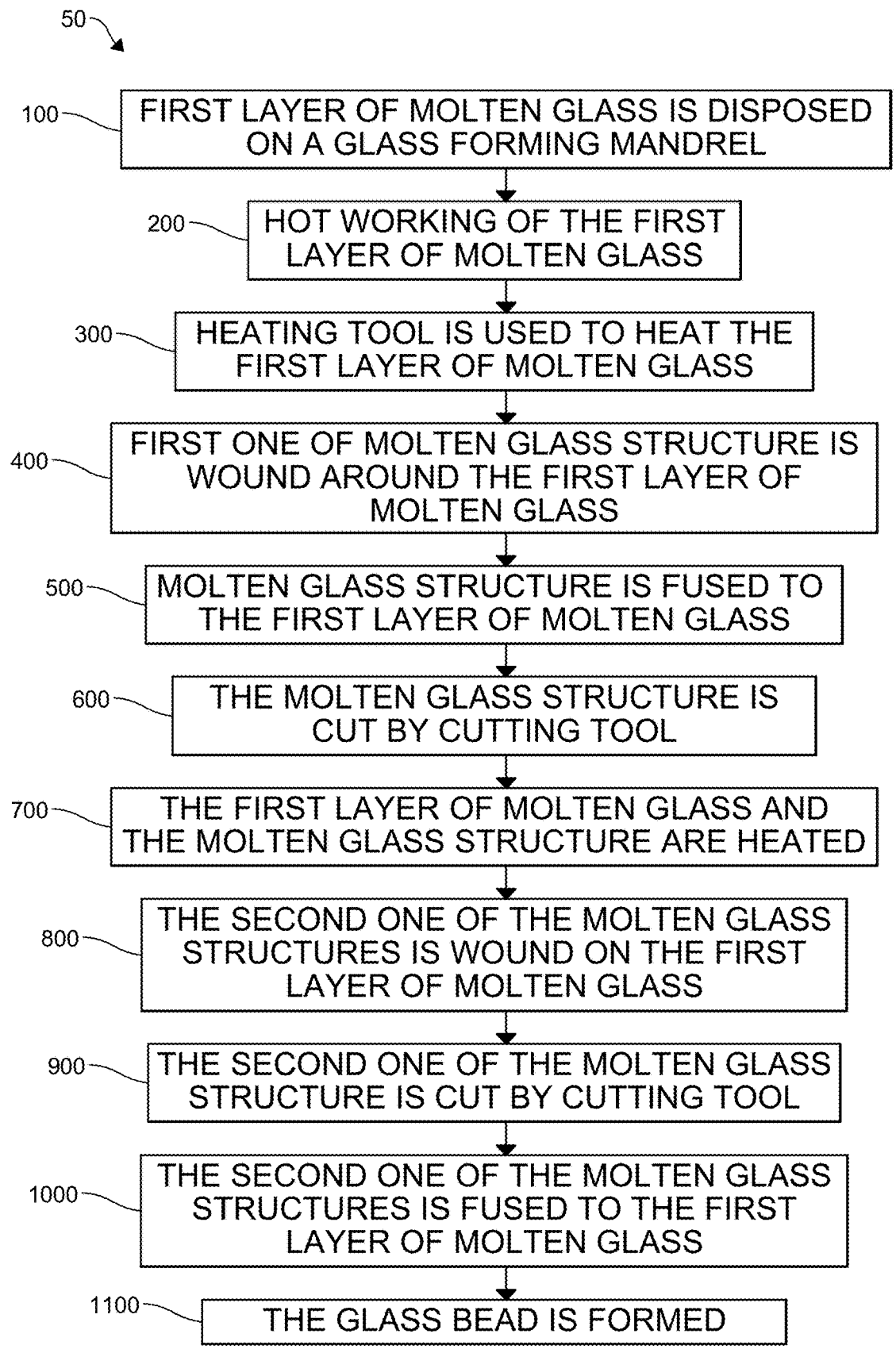
FIG. 17 illustrates a flow diagram of the method of forming glass beads.

In an eleventh step 1100, as shown in FIG. 16, the glass bead 2, 3 is formed. To form the glass bead 2, 3, additional hot working of the fused workable piece 35 is performed with the heating tool 1*b* and a bead forming manipulating tool 36. The heating tool 1*b* heating the molten glass after the first one of the glass structures is fused thereon with a heating element according to a seventh step of the method of forming glass beads is used to maintain the fused workable piece 35 at a desired temperature, thereby allowing the use of the bead forming manipulating tool 36. In the embodiment illustrated, the bead shaping manipulating tool 36 includes an elongate grip portion 38 and an annular sphere shaping portion 40. The sphere shaping portion 40 engages the outer surface of the fused workable piece 35 and desired pressure is applied by the sphere shaping portion 40 to shape the fused workable piece 35 into a sphere. It is understood other varying bead forming manipulating tools may be employed in alternatively or in addition to the bead forming manipulating tool 36.

It is understood, a variety of colors and patterns may be provided in the glass bead 2, 3. The method 50 results in formation of the glass bead 2, 3 in a spherical shape. Symmetrical and irregularly shaped glass structures 9 may be wound together and fused within the layers of molten glass.

In accordance with the eleventh step 1100, the bead 2, 3 and mandrel 22 are placed into an annealing oven at about 918 degrees Fahrenheit to anneal the glass bead 2, 3. Although, other temperatures can be employed without departing from the scope of the disclosure. The heated glass bead 2, 3 is then cooled down slowly.

Initially, in the embodiment shown and described, the glass bead is placed in an oven for 6 hours at 918 degrees Fahrenheit. This is the annealing temperature. It should be noted that the annealing temperature varies for the type of glass being used. Thus, this temperature may differ from that disclosed herein. For a preferred crystalica glass, the annealing temperature is about 918 degrees Fahrenheit. After 6 hours in the annealing oven, the glass bead 2, 3 is left in the oven for an additional 2 hours. The temperature is then permitted to drop to about 770 degrees Fahrenheit for about or greater than 2 hours. Then the temperature is permitted to drop to about 200 degrees Fahrenheit over about 5 hours or to about room temperature over about 6 hours.

This schedule of annealing is described graphically in the following table:

| Time (hours) | Temperature (° F.) |
|---|---|
| 6 | 915 |
| 2 | 915 hold |
| 2 | 770 |
| 5-6 | 200 |

Advantageously, the method of forming glass beads 50 according to the disclosure permits a glass bead 2, 3 with a desired diameter between 1-3 inches to be formed with desired aesthetically pleasing colors to be dispersed throughout the glass bead 2, 3. The method of forming glass beads 50 maximizes efficiency, precision, cost effectiveness, easy manipulation of design for an artist, strength of the resulting bead 2, 3 and results in a artistically desired clear glass bead with artistically desired colors interspersed in accordance with artistic.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method of forming a glass bead according to the following steps:
preheating a mandrel to a temperature of about 1,500 degrees Fahrenheit;
inserting a bit iron receiving a glass into a furnace to heat the glass into a first layer of molten glass;
delivering the first layer of molten glass to the mandrel with the bit iron;
spooling and hot working the first layer of molten glass around a mandrel by rotating the mandrel;
attaching a first glass structure to a feeder rod after the step of spooling and hot working the first layer of molten glass around the mandrel, wherein the first glass structure includes a first color, and wherein the first glass structure is substantially cylindrically shaped;
heating the first glass structure with a handheld torch to a temperature of about 2,100 degrees Fahrenheit to form a first molten glass structure having the first color after the step of attaching the first glass structure to the feeder rod;
winding the first molten glass structure onto the first layer of molten glass;
fusing the first molten glass structure to the first layer of molten glass with the handheld torch to form a fused workable piece including the first color interspersed throughout the fused workable piece after the step of heating the first glass structure with the handheld torch;
heating the fused workable piece with the handheld torch to prepare for a step of receiving a second molten glass structure or a step of forming the fused workable piece into the glass bead;
attaching a second glass structure to the feeder rod, wherein the second glass structure includes a second color, and wherein the second glass structure is substantially cylindrically shaped;
heating the second glass structure with a handheld torch to a temperature of about 2,100 degrees Fahrenheit to form a second molten glass structure having the second color after the step of attaching the second glass structure to the feeder rod;
winding the second molten glass structure at least one of the first layer of molten glass and the first molten glass structure; and
forming the fused workable piece into the glass bead including the first color interspersed through the glass bead, wherein the glass bead has a diameter in a range of about 2 to 3 inches, wherein the step of forming the fused workable piece into the glass bead includes the step of forming the fused workable piece into a solid sphere with an aperture extending therethrough, wherein the step of forming the fused workable piece into the glass bead includes the step of annealing the glass bead in an annealing oven, wherein the step of annealing the glass bead includes the following steps:
first, disposing the glass bead in the annealing oven at about 918 degrees Fahrenheit for at least six hours;
second, dropping the temperature of the annealing oven to 770 degrees Fahrenheit for at least two hours; and
third, dropping the temperature to 200 degrees Fahrenheit for at least 5 hours.

2. The method of claim 1, wherein the first molten glass structure includes a third color.

3. The method of claim 2, wherein the first molten glass structure includes a fourth color.

4. The method of claim 1, wherein the step of forming the fused workable piece into the glass bead includes using a bead forming manipulating tool, wherein the bead forming manipulating tool includes an elongate grip portion and an annular sphere shaping portion.

5. The method of claim 1, wherein the step of annealing the glass bead further includes the following step:
holding the temperature at 918 degrees Fahrenheit for at least two hours after disposing the glass bead in the annealing oven at about 918 degrees Fahrenheit for at least six hours and before dropping the temperature of the annealing oven to 770 degrees Fahrenheit for at least two hours.

6. The method of claim 1, wherein the first layer of molten glass is clear.

7. The method of claim 1, wherein the glass bead is about 2.5 inches in diameter.

8. The method of claim 1, wherein the step of fusing a first molten glass structure to the first layer of molten glass to form a fused workable piece includes the step of cutting a piece of the first molten glass structure from the glass structure to separate the first molten glass structure from the glass structure to fuse the piece of the first molten glass structure to the first layer of molten glass.

9. The method of claim 1, wherein a second layer of molten glass is disposed on the first layer of molten glass.

* * * * *